UNITED STATES PATENT OFFICE.

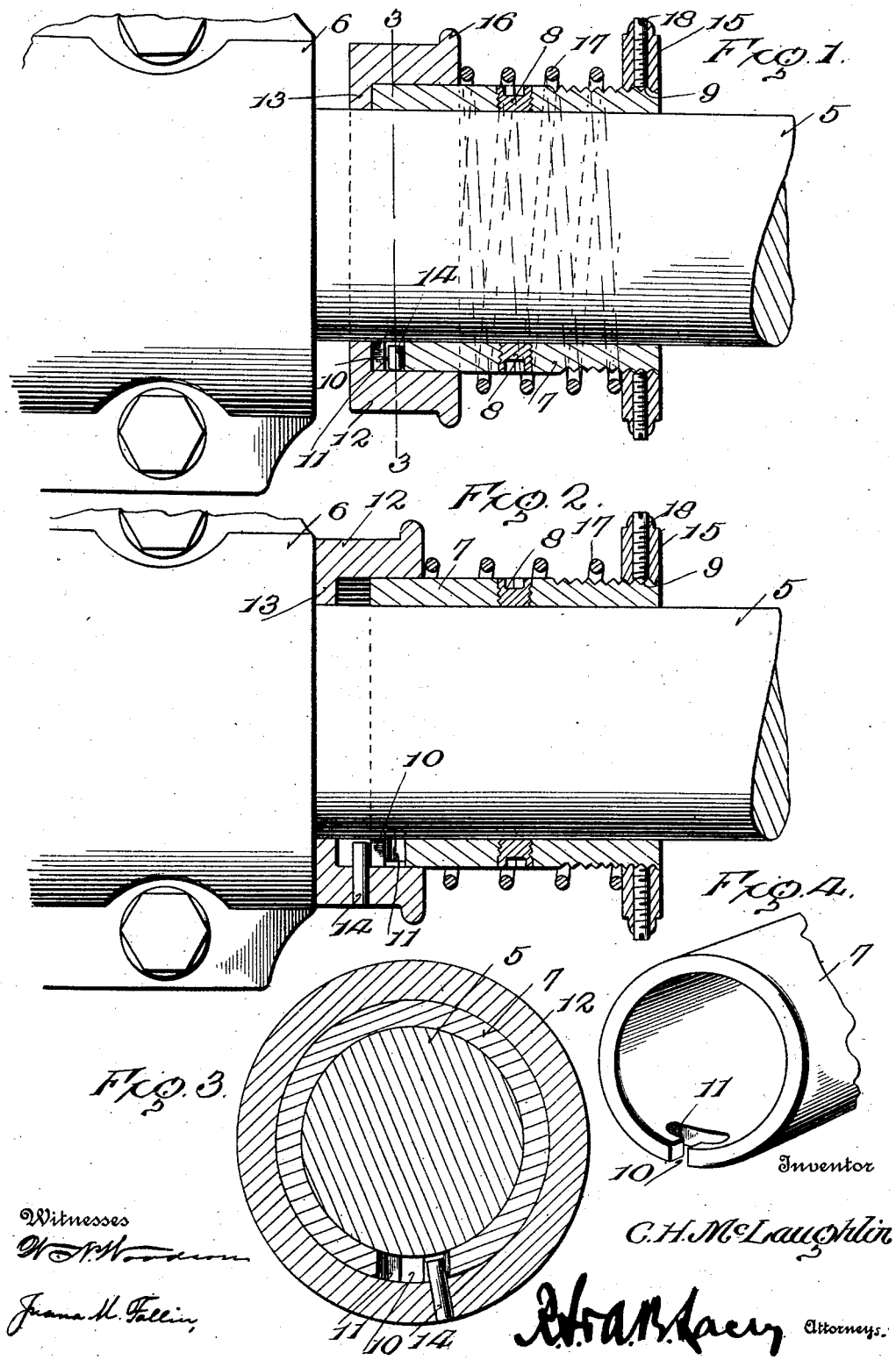

CHARLES H. McLAUGHLIN, OF WILLIAMSPORT, PENNSYLVANIA, ASSIGNOR OF ONE-THIRD TO JOHN COLEMAN AND ONE-THIRD TO JOHN J. COLEMAN, OF WILLIAMSPORT, PENNSYLVANIA.

AUTOMATIC SPRING TAKE-UP COLLAR.

972,216.    Specification of Letters Patent.    Patented Oct. 11, 1910.

Application filed January 13, 1910. Serial No. 537,945.

*To all whom it may concern:*

Be it known that I, CHARLES H. McLAUGHLIN, a citizen of the United States, residing at Williamsport, in the county of Lycoming and State of Pennsylvania, have invented certain new and useful Improvements in Automatic Spring Take-Up Collars, of which the following is a specification.

This invention relates to an automatic spring take up collar and has for its object the provision of a strong, durable and thoroughly efficient device of this character, for taking up end motion on the arbors or shafts of different kinds of machinery.

A further object is to provide an automatic take up including a sleeve having means for attachment to a shaft or arbor and provided with a collar adapted to engage the bearing of said shaft or arbor.

A further object is to provide a pin and slot connection between the sleeve and collar, the parts being so arranged that when the sleeve and collar are locked, a slight longitudinal play of the shaft or arbor is permitted, and when the parts are released, the spring will force the collar into engagement with the bearing and hold the arbor against longitudinal movement.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a top plan view partly in section of an automatic spring take up constructed in accordance with my invention, showing the sliding collar spaced from the bearing; Fig. 2 is a similar view showing the sliding collar in engagement with the bearing; Fig. 3 is a vertical sectional view taken on the line 3—3 of Fig. 1; Fig. 4 is a perspective view of one end of the clamping sleeve.

Corresponding and like parts are referred to in the following description and indicated in all the views of the drawings by the same reference characters.

The improved automatic take up forming the subject matter of the present invention is principally designed for use on woodworking machinery and by way of illustration is shown in connection with the shaft or arbor of a planing machine, the arbor being indicated at 5 and the bearing for said arbor at 6.

The device comprises a sleeve 7 having oppositely disposed threaded openings formed therein for the reception of screws or similar fastening devices 8, the latter serving to key or lock the sleeve on the arbor 5. One end of the sleeve 7 is exteriorly threaded at 9, while the other end thereof is provided with an opening 10 which intersects a horizontally disposed slot 11 also formed in the sleeve.

Slidably mounted on the slotted end of the sleeve 7 is a collar 12 having an inwardly extending flange 13 adapted to bear against the adjacent end of the sleeve 7 and provided with an inwardly extending pin 14 adapted to bear against the walls of the slot 11 for the purpose of locking the sleeve and collar in engagement with each other and normally spacing the latter from the bearing 6. Engaging the threaded end 9 of the sleeve 7, is a correspondingly threaded adjusting collar 15, and interposed between said collar and the lateral flange 16 of the sliding collar 12, is a coil spring 17, the function of which is to force said sliding collar against the bearing 6 when the pin 14 is disengaged from the slot 11, the tension of the spring 17 being sufficient to overcome the end thrust of the shaft or arbor. By rotating the adjusting collar 15 on the threaded end of the sleeve 7, the tension of the spring 17 may be regulated at will, said collar 15 being secured in adjusted position by means of threaded pins 18 extending through the collar 15 and bearing against the threaded end of the sleeve 7, as shown. Thus it will be seen that by partially rotating the collar 12, the pin 14 will register with the opening 10, thus releasing the collar from the sleeve 7 and permitting the spring 17 to force the collar 12 laterally into engagement with the bearing 6. By forcing the sliding collar 12 in the direction of the adjusting collar 15, the pin 14 will enter the opening 10, when a partial rotation of the sleeve 7 will cause the pin to bear against one wall of the slot 11 and thus lock the sleeve and collar 12 in engagement with each other so as to space the flange 13 of the collar from the bearing 6.

When the machine is used for ordinary planing, the sleeve 7 and collar 12 are locked in engagement with each other so as to allow the arbor to run free and thus wear the journals evenly. When working beaded lumber of all kinds, also sidings, moldings and the like, the collar 12 is disengaged from the sleeve 7 in the manner before described, thus causing the spring 17 to force the collar against the bearing 6 and hold the arbor against longitudinal movement. The pin and slot connection also forms a convenient means for holding the device in assembled position while positioning the take up on or removing said take up from the arbor or shaft.

Having thus described the invention, what is claimed as new is:

1. The combination with a bearing, of an arbor journaled therein, a sleeve rigidly secured to the arbor, a collar slidably mounted on the sleeve, means for locking the sleeve and collar in engagement with each other, and means for forcing the collar against the bearing when the locking means is released.

2. The combination with a bearing, of an arbor journaled therein, a sleeve rigidly secured to the arbor, a collar slidably mounted on the sleeve, a spring interposed between the sleeve and collar for forcing the latter against the bearing, and means independent of the spring for supporting the collar in spaced relation to said bearing.

3. The combination with a bearing, of an arbor journaled therein, a sleeve rigidly secured to the arbor, a collar slidably mounted on the sleeve, a pin and slot connection between the sleeve and collar for normally spacing the collar from the bearing, and a spring interposed between the sleeve and collar for forcing the latter against the bearing when said collar is disengaged from the sleeve.

4. The combination with a bearing, of an arbor journaled therein, a sleeve rigidly secured to the arbor, a collar slidably mounted on the sleeve, a spring surrounding the sleeve and bearing against the collar for forcing the latter against the bearing, means for regulating the tension of the spring, and means for locking the collar and sleeve in engagement with each other and in spaced relation to the bearing.

5. The combination with a bearing, of an arbor journaled therein, a sleeve secured to the arbor and having one end thereof threaded and its other end provided with a slot opening through said end, a collar slidably mounted on the sleeve, a pin extending inwardly from the collar and adapted to engage the walls of the slot for locking the collar in engagement with the sleeve, an adjusting collar engaging the threads on the sleeve, and a spring interposed between the adjusting collar and sliding collar.

6. The combination with a bearing, of an arbor journaled therein, a sleeve secured to the arbor and having a slot formed therein, there being an opening formed in one end of the sleeve and intersecting the slot, a collar slidably mounted on the sleeve and provided with an inwardly extending flange adapted to bear against the adjacent end of the sleeve, a pin extending inwardly from the collar and operating within the slot of the sleeve, and means for yieldably supporting the collar in engagement with the bearing when the pin is disengaged from said slot.

7. The combination with a bearing, of an arbor journaled therein, a sleeve having one end thereof threaded and its other end provided with a slot intersected by an opening, clamping screws threaded in the walls of the sleeve and bearing against the arbor, a collar slidably mounted on the sleeve and provided with a pin adapted to bear against the walls of the slot, an adjusting collar threaded on the sleeve, a spring interposed between the sliding collar and adjusting collar, and fastening devices extending through the adjusting collar and bearing against the threaded end of the sleeve for locking said collar in adjusted position.

8. The combination with a bearing, of an arbor journaled therein, a take up device normally free to rotate with the arbor and including mating members having a pin and slot connection, and means for forcing one of said members into frictional engagement with the bearing when the pin is disengaged from the slot, thus to hold the arbor against longitudinal movement.

In testimony whereof I affix my signature in presence of two witnesses.

CHARLES H. McLAUGHLIN. [L. S.]

Witnesses:
J. F. KATZMAIER,
JOHN A. BUBB.